United States Patent [19]

Wilkinson

[11] 3,995,991

[45] Dec. 7, 1976

[54] FORCED AIR HEATER

[76] Inventor: David Bruce Wilkinson, 1489 Lemcke Road, Xenia, Ohio 45385

[22] Filed: Dec. 15, 1975

[21] Appl. No.: 640,744

[52] U.S. Cl. .................................. 432/222; 432/62
[51] Int. Cl.[2] .......................................... F24H 3/04
[58] Field of Search .............................. 432/222, 62

[56] References Cited
UNITED STATES PATENTS

| | | | |
|---|---|---|---|
| 2,194,713 | 3/1940 | Mitchell | 432/222 |
| 2,195,957 | 4/1940 | Joyce | 432/222 |
| 3,077,343 | 2/1963 | Mohn | 432/222 |
| 3,160,401 | 12/1964 | Wollner | 432/222 |
| 3,781,165 | 12/1973 | Wilkinson | 432/62 |

*Primary Examiner*—John J. Camby

[57] ABSTRACT

A forced air heater using self-pressurizing fuels such as propane or butane to drive the blower incorporates an overheat dump port to provide an auxiliary exit for the hot air in the event that the normal outlet becomes obstructed. Also included are means for removing condensation from the fuel conduit, for preheating the fuel source, and for continuing to warm the fuel source and fuel conduit to improve operation of the forced air heater in cold environments. The overheat dump port also provides access into the heater for the high voltage conduit of a spark generator for igniting the fuel within the need for insulating the high voltage conduit.

9 Claims, 10 Drawing Figures

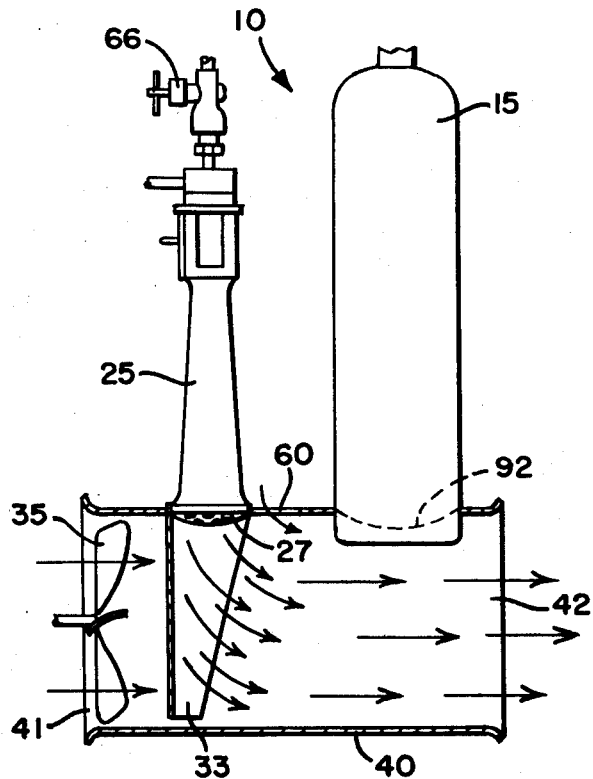
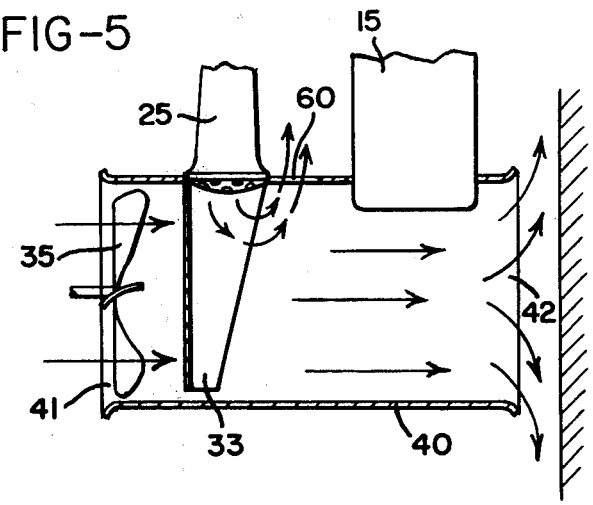
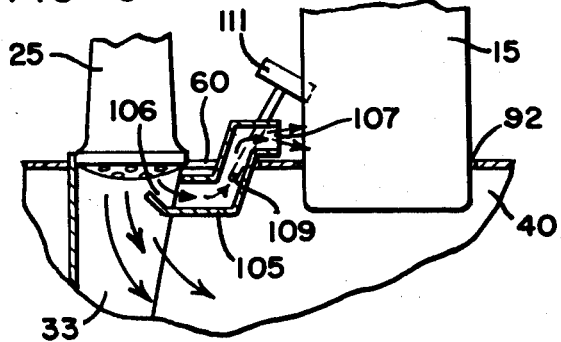
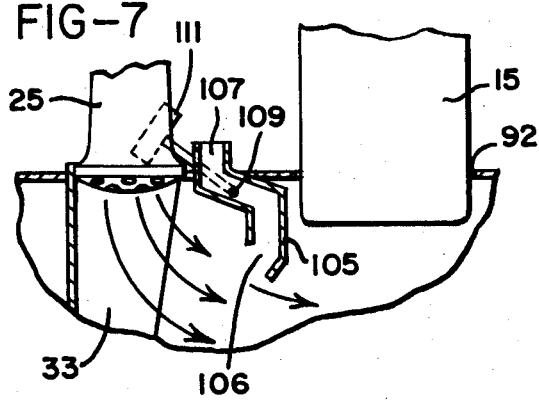
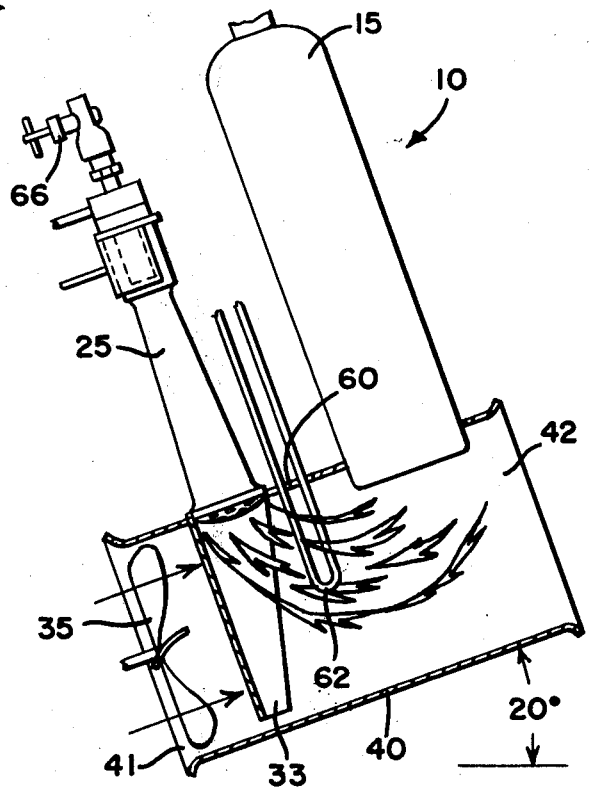

FORCED AIR HEATER

BACKGROUND OF THE INVENTION

This invention relates to forced air heaters, and more particularly to improvements in the portable forced air heater shown in my U.S. Pat. No. 3,781,165. This heater is particularly useful for supplying heated air in locations where electrical and/or mechanical power is not readily available. It is designed for use with fuels such as propane and butane, which can be stored under pressure as liquids at room temperature, but which are self-pressurizing and automatically supply the fuel as a pressurized gas. This eliminates the need to pressurize the fuel in order to drive the pneumatic motor which drives the heater fan or blower, thus providing a highly efficient, portable and inexpensive forced air heater.

SUMMARY OF THE INVENTION

Briefly the present invention provides a number of operating and safety improvements over my earlier forced air heater. In particular, the present invention incorporates an overheat dump port in the heater plenum chamber to provide an auxiliary exit for the air forced into the plenum by the fan and for the combustion products of the burning fuel also exhausted into the plenum. In regular operation, this heat is exhausted through the normal plenum chamber outlet, and the heater is structured to cause a slight inward flow of air through the overheat dump port. However, when the plenum chamber outlet becomes obstructed, the pressure conditions at the overheat pump port reverse and permit the heated air and combustion products to be exhausted therethrough, thus maintaining substantially uninterrupted movement thereof.

Without the overheat dump port, obstruction of the plenum chamber outlet would cause the fan blades to stall near their roots but continue blowing air inwardly near their tips. This would cause a flow reversal near the center of the fan, and hot, sometimes burning gases could backfire out over the fan and motor. It is thus quite desirable to be able to maintain uninterrupted movement and exhaust in the normal direction through the plenum chamber. On the other hand, it is important that the overheat dump port exhausts these products only upon obstruction of the plenum outlet. The overheat dump port must therefore be located in a portion of the plenum chamber which is downstream from the fuel burner but which has a normal operating pressure at or below the ambient atmospheric pressure. This might call for a rather straightforward application of the venturi effect of the moving air stream, but for the fact that the gas is being heated, causing an upstream pressure increase. The heater flameholder is therefore used to provide a nozzle or restriction in the plenum so that the subsonic diffusion occuring downstream therefrom creates favorable pressure conditions which counteract the upstream pressure increase caused by the heat injection.

This type of heater, by its very nature, is normally used in cold environments. This means that the propane or butane fuel, although self-pressurizing, delivers a lower pressure than at room temperature. This problem may be further aggravated by the cooling which occurs as the liquid fuel boils during operation of the heater. Consequently, the pressure may fall too low for satisfactory operation of the pneumatic motor.

The present invention therefore provides several features for warming the fuel container to help keep the fuel container at temperatures near normal room temperature. These features include a preheat mode of operation which bypasses the pneumatic motor and operates the burner independently to heat the fuel container until the pressure reaches the desired operating pressure. The fuel container itself is located with its bottom projecting into the interior of the plenum chamber so that it is continually exposed to the heat produced by the fuel burner, and is thus warmed during both normal operation and while in the preheat mode of operation.

An auxiliary heat duct is also provided for supplying additional heat to the container. The duct is mounted to intercept and convey a portion of the hot output of burning fuel and combustion products from the fuel burner and to convey these directly to the fuel container. In the preferred embodiment the heat duct is positioned in the overheat dump port and is pivoted in this location for movement between active and inactive positions. In the active position the inlet end of the duct is positioned immediately adjacent the burner and the outlet end is located outside the plenum chamber adjacent the side of the fuel container. Thus the heat duct may be positioned to convey very hot gases directly from the burner to a portion of the fuel container not otherwise heated.

The pivot for the heat duct is located below the center of gravity of the movable parts of the duct and pivot when the duct is approximately midway between the active and inactive positions. This causes the duct to be biased gravitationally to remain in one or the other of these positions whenever it is placed in that particular position. Put another way, the midway position between the active and inactive positions is gravitationally unstable, so it will tend to fall off to one side or the other.

In operation, especially in colder environments, it can be seen that the temperature of the fuel container may be higher than that of the exposed downstream fuel conduit. Since the fuel system is by nature one which is operating at the equilibrium pressure of the fuel, it follows that warming the fuel storage container will increase the vapor pressure of the system above the equilibrium pressure for the cooler downstream portions of the fuel conduit. This can cause condensation which in turn can result in liquid fuel being supplied intermittently to the pneumatic motor, interfering with its proper operation. The present invention therefore provides a heat exchanger for exposing the portion of the fuel conduit between the fuel storing container and the pneumatic motor to the heat produced by the fuel burner in order to maintain the temperature of the conduit upstream from the pneumatic motor. A segment of this portion of the fuel conduit passes in and out of the plenum through the overheat dump port, so that the segment is located within the plenum in the stream of the hot combustion products of the fuel burner. This segment is deliberately kept rather small since it is not desired to warm the gaseous fuel very much, but rather simply to prevent condensation. In fact, if the fuel is heated much above room temperature, the motor lubricant, which is supplied by an oiler in the fuel conduit line, will evaporate. This causes friction in the blower motor which reduces the blower output.

Nevertheless, it is not uncommon to find condensed fuel in the fuel conduit. This does not occur during normal operation of the forced air heater, but it can during periods of storage. The present invention therefore also provides a means for purging the fuel conduit of any liquid fuel which may be there, and this is done preferably during the initial start up of the heater. More particularly, the fuel conduit includes a low point shortly upstream from the pneumatic motor. Condensation in the fuel conduit will therefore tend to collect at this low point. A secondary fuel line which is connected to the fuel conduit at this low point runs directly between the low point and the fuel burner so that fuel and fuel condensate which has collected at this low point can be conducted directly to the fuel burner, bypassing the pneumatic motor. This secondary fuel line also includes a valve which controls this bypassing flow of fuel to permit controlled operation of the burner independently of the pneumatic motor. This valve is normally used as a preheat valve since it is normally operated to provide heat for the plenum to warm the fuel container without operation of the fan when the fuel container temperature is too low to provide the desired operating pressure for the system. However, the valve may be used at any time to bypass the pneumatic motor, and may be used at initial start up to purge liquid which may have collected at the fuel conduit low point.

The overheat dump port in the present invention provides a convenient access port for the high voltage electrode of the piezoelectric starter. In order to ignite the fuel at the burner, a spark is struck at the flame arrester screen at the burner head. This means that the high voltage electrode must pass from the piezoelectric starter through the plenum wall and up to the burner head. Since the plenum chamber wall is grounded, high voltage insulation would ordinarily be required at the point where the electrode passes through the plenum wall, but insulation in this area would be exposed to high temperatures. By passing the electrode through the overheat dump port in the present invention, the need for insulating the high voltage conduit from the plenum has been eliminated.

The present invention also provides improvements in the control valve for the pneumatic motor. It is now possible to adjust the inlet valve of the motor to control the opening and closing thereof as desired. The valve body is mounted in the cylinder head for adjustably positioning it inwardly or outwardly thereof. The valve body includes a poppet valve which has a finger which is engaged by the piston to open the poppet valve as the piston approaches top dead center. The valve body is then moved inwardly or outwardly of the cylinder to adjust and determine the degree and duration of engagement between the poppet valve finger and the piston head, and hence the degree and duration of the valve opening.

It is therefore an object of the present invention to provide safety and operating improvements for a forced air heater; to provide an overheat dump port for such a forced air heater to maintain substantially uninterrupted movement and exhaust in the event that the normal outlet becomes obstructed; to provide such a dump port which ordinarily induces a flow of air into the heater; to provide a controllable preheat mode for the heater; to provide for continuously warming the fuel container in the event that ambient temperature conditions are too cool for the fuel to provide a sufficient operating pressure; to counteract condensation of the fuel in the fuel conduits of the heater; to permit condensate which does form to be drained from the fuel conduit; to provide for supplying additional heat to the fuel container as needed; to eliminate the need to insulate the high volage electrode of the starter; and to provide an improved, adjustable inlet valve for the pneumatic motor.

Other objects and advantages of the invention will be apparent from the following description, the accompanying drawings and the appended claims.

BRIEF DESCRIPTION OF THE DRAWINGS

FIG. 4 is a figurative side view of several of the main components of the heater illustrating flow paths during normal heater operation;

FIG. 5 is a view similar to FIG. 4 illustrating flow paths during partial obstruction of the plenum outlet;

FIG. 6 is a fragmentary view showing the heat duct in the active position;

FIG. 7 is a view similar to FIG. 6 showing the heat duct in the inactive position;

FIG. 8 illustrates operation of the heater in the preheat mode;

DESCRIPTION OF THE PREFERRED EMBODIMENT

Figure 1:
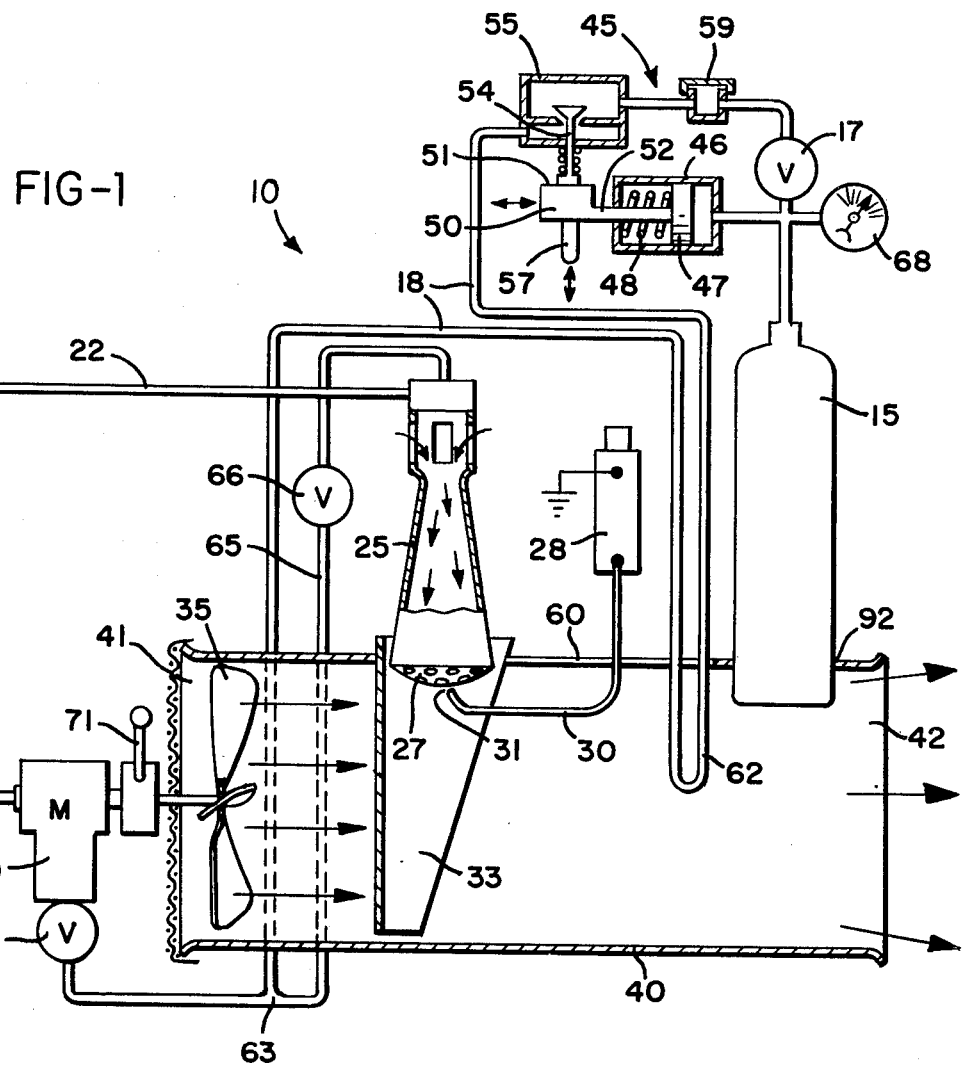
FIG. 1 is a somewhat schematic side view, partially in section, of my improved forced air heater, with the heat duct omitted for clarity of illustration.
Figure 2:
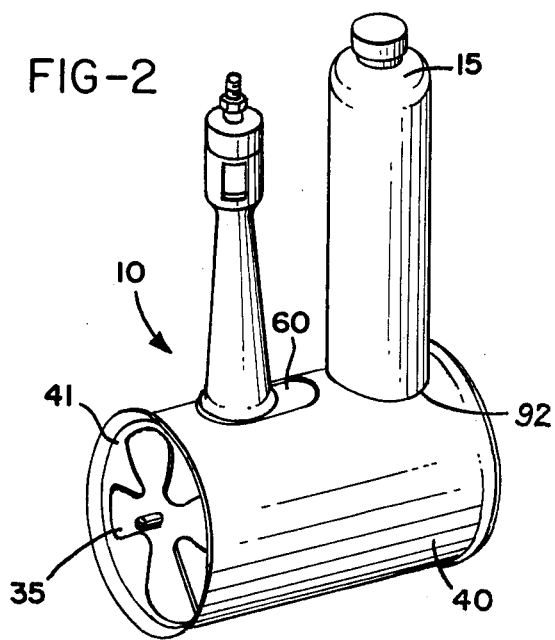
FIG. 2 is a perspective side view illustrating the respective positions of the plenum, fuel container, and burner.
Figure 3:
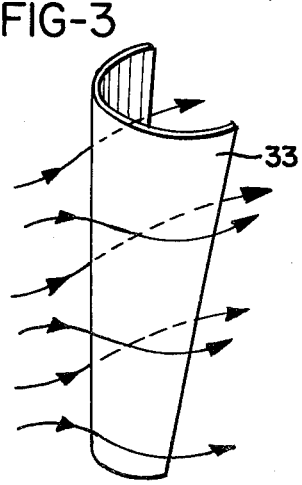
FIG. 3 is a perspective side view of the flame holder illustrating the flow of the forced air therepast.

FIG. 1 illustrates a forced air heater 10 similar to that disclosed in my U.S. Pat. No. 3,781,165, but incorporating the improvements provided by the present invention. That is, a fuel container 15 supplies propane or butane fuel through a fuel container valve 17 and fuel conduit 18 to a pneumatic motor 20. The pressurized, gaseous fuel drives the motor and then exhausts through a fuel conduit exhaust line 22 to a gas burner 25. The fuel at the burner is ignited at the burner flame arrester screen 27 by a high voltage spark from a piezoelectric starter 28. The high voltage electrode 30 of starter 28 conducts the output of the starter to an arc gap 31 between the electrode 30 and the flame arrester screen 27. The resulting flame from the burner 25 is shielded by a flame holder 33 from the blast of air provided by a fan 35 which is driven by the pneumatic motor 20. The flame of burning fuel, the combustion products thereof, and the flow of air from the fan 35 are all contained by and conducted through a plenum chamber 40 having an inlet 41 near the fan and an outlet 42 at the opposite end thereof.

As the fuel leaves the fuel container 15 it first operates a safety shutoff valve assembly 45. The safety shutoff valve assembly 45 includes a safety shutoff valve operator 46 having a piston 47 which is driven against a spring 48 by the gas pressure of the fuel in the fuel container 15. The piston 47 has a piston rod 50 having a raised portion 51 and a depressed portion 52. When the pressure of the fuel becomes great enough it drives the raised portion 51 past the stem 54 of a safety shutoff valve 55 located in the fuel conduit 18. The safety shutoff valve stem 54 then drops into the depressed portion 52 of piston rod 50, closing the safety shutoff valve 55. Valve 55 remains closed, even after the fuel pressure in container 15 is reduced, until the safety shutoff valve 55 is again opened by pushing safety valve reset 57 to raise the stem 54 above the raised portion 51 of the piston rod 50. Spring 48 then draws the raised portion 51 of piston rod 50 back beneath the safety shutoff valve stem 54 to hold the safety shutoff valve open. Preferably, when propane fuel is used, the safety shutoff system 45 is set to operate at 140 psig, which is well below the 300 psig set point of the pressure releaf valve (not shown) commonly supplied with commercially available propane fuel containers. As will also be appreciated, lost motion of the piston rod 50 is provided prior to shutoff of the valve 55 so that the "breakout" force of the seals (not shown) for the piston 47 will not affect the valve shut off operating point.

An oiler 59 in the fuel conduit 18 causes the fuel to entrain a small quantity of lubricant in order to minimize friction in the pneumatic motor 20. The fuel then passes through the safety shutoff valve 55 and through an overheat dump port 60 into a heat exchanger segment 62 of the fuel conduit 18. Segment 62 is located within the plenum chamber 40 to warm the fuel sufficiently to prevent condensate from developing in the fuel conduit upstream from the pneumatic motor 20. However, the heat exchanger segment 62 is quite small in order to prevent the fuel from being raised to a temperature which might vaporize the oil. Thus the heat exchanger segment 62 does not actually provide sufficient heat to vaporize much liquid fuel, but rather simply warms the already gaseous fuel to counteract any tendency toward condensation.

The fuel is then conducted out of the plenum 40 by conduit 18, which again passes through the overheat dump port 60, and then to the pneumatic motor 20. Shortly before motor 20 the conduit 18 reaches a low point 63 which is provided to collect liquid fuel which may have condensed during periods of non-use of the forced air heater.

At the low point 63 a secondary fuel line 65 permits gaseous and condensed liquid fuel to be drawn from the low point through a preheat valve 66 directly to the burner 25. Valve 66 is therefore normally opened during the initial start up of the forced air heater to purge fuel condensate from the low point 63 prior to starting motor 20. Burner 25 is also preferably operated by means of line 65 and valve 66 whenever the forced air heater 10 has been stored in a cold place. Under these conditions, for example when the temperature of the fuel container 15 is below 30° F., the pressure of the propane fuel may be too low (below 50 psig) to drive the fan motor 20 satisfactorily. The burner is then operated for a while without the motor, and the heater 10 may be tilted as illustrated in FIG. 8, to cause the heat from the burner to warm the heat exchanger segment 62 and the bottom of the fuel container 15. Then, when the fuel pressure indication on gauge 68 (FIG. 1) is high enough, valve 66 is closed. The forced air heater is now ready for normal operation, so the pneumatic motor 20 is barred over by the starting lever 71 mounted thereon. Lever 71 operates through a one-way clutch (not shown), such as a ball clutch, to be certain that the motor starts in the proper direction, and to prevent the motor from running in the reverse direction.

Figure 10:
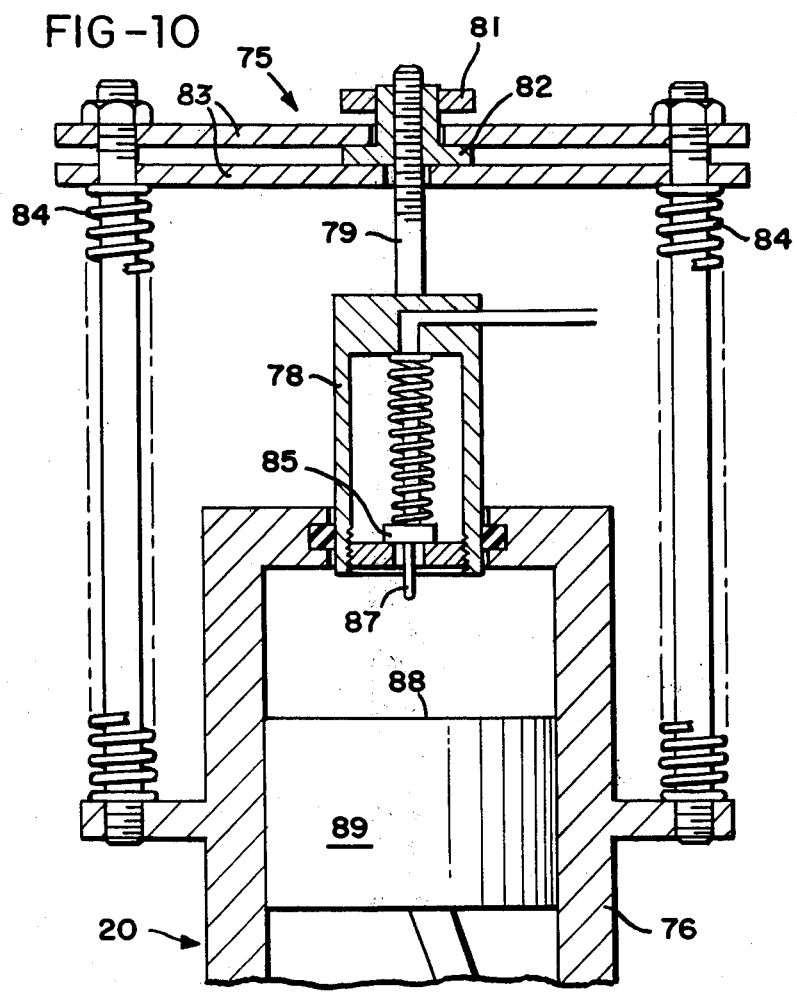
FIG. 10 is a schematic view in cross section of the motor valve.

The speed of the motor is regulated by a motor valve 75 (FIGS. 1 and 10) located in the head of the motor cylinder 76. Valve 75 includes a valve body 78 which can be moved inwardly and outwardly of the cylinder 76 by means of a threaded stud 79 attached thereto and threaded through a control knob 81. Control knob 81 is kept in position by means of an integral friction disc 82 which is clamped between two friction plates 83 biased toward one another by springs 84. The friction plates 83 also keep the control knob 81 in a fixed translational position so that it, in turn, determines the position of the valve body 78 by means of the threaded stud 79.

Motor valve 75 includes a poppet valve 85 mounted in the valve body 78 for admitting the fuel gas to the motor cylinder 76 when opened. Poppet valve 85 has a finger 87 which extends therefrom into the motor cylinder 76 and is engaged by the piston head 88 to open the valve as the piston 89 approaches top dead center. Thus, by rotating the control knob 81, it is possible to adjust valve body 78, as well as the poppet valve 85 and finger 87 carried thereon, to position them inwardly or outwardly of the cylinder to determine the degree and duration of the opening of the poppet valve 85.

Referring to FIGS. 1 and 4, in normal operation the heated air, including the burning fuel and hot combustion products thereof, are exhausted into the plenum chamber 40 and then pass through the outlet 42 thereof. If the outlet becomes obstructed (FIG. 5), the overheat dump port 60 provides an auxiliary exit to maintain substantially uninterrupted movement and exhaust. Overheat dump port 60 is therefore located immediately downstream from the fuel burner, and preferably in a region having a normal operating pressure slightly below the ambient atmospheric pressure. Under this condition air flow is normally induced into the plenum chamber through the overheat dump port 60, and exhausts outwardly therethrough only upon obstruction of the plenum outlet. In fact, in order to prevent overheating of the downstream portions of the plenum when the outlet is obstructed, it is desirable to have the overheat dump port intercept the highest temperature gas. The dump port is therefore located upstream of the terminal end of the flame of the fuel burner in order to divert as much of the fuel burner flame as possible.

While it may not be readily apparent, this placement of the overheat dump port 60 would ordinarily be at a location where the plenum pressure exceeded the atmospheric pressure, due to the injection of heat by the burner 25. That is, the heat from the burner 25 would create upstream pressurization which would counteract the venturi effect created by the movement of air past the overheat dump port in the side wall of the plenum. The pressure condition at the overheat dump port 60 is therefore improved by the flame holder 33 which forms a restriction immediately ahead of the overheat dump port. The flow restriction caused by flame holder 33 thus generates an additional venturi effect in the diffusion region immediately downstream therefrom, and this is sufficient to counteract the pressure increase caused by the injection of heat by burner 25.

There is a fuel container opening 92 through the plenum 40 near outlet 42 to permit a portion of the fuel container 15 to be inserted to expose it to the heat produced by the burner 25. This helps counteract cooling of the fuel storage container 15 as fuel is withdrawn during operation of the heater 10. It also permits the container 15 to be warmed during the preheat mode of operation which was discussed earlier and is illustrated in FIG. 8.

Figure 9:
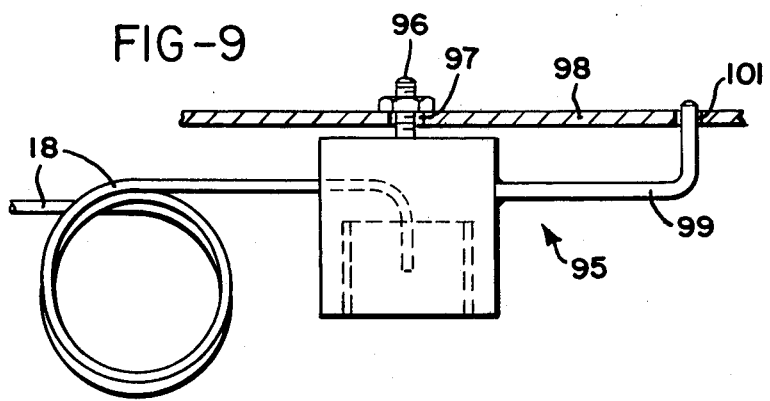
FIG. 9 is a side view of the fuel container connector.

Since commercially available propane containers may have their connectors aligned in slightly different directions, the present invention provides a fuel container connector 95 (FIG. 9) which is free to shift its axis slightly to accommodate various alignments of the threaded nipples on the tops of the fuel containers. This is important in the present invention since the fuel container opening 92 into the plenum 40 prevents the fuel container from translating in the event that the fuel container nipple is slightly misaligned. Thus the connector 95 is loosely attached to the forced air heater 10 by a stud which extends through an over size hole 97 in the frame 98 of the heater. An arm 99 extends radially outwardly from the connector 95 and then bends to pass through a hole 101 in the heater frame 98. Hole 101 is also large with respect to arm 99 so that the arm is loosely received therein. By this means, the connector 95 and arm 99 may "wobble" to accommodate a misaligned fuel container nipple, but arm 99 prevents the connector 95 from rotating on its own axis, that is, the axis of stud 96.

In the event that further heating of the fuel container is desired, in addition to that provided to the bottom of the container by the fuel container opening 92, a heat duct 105 (FIGS. 6 and 7) may be pivoted from an inactive position (FIG. 7) to an active position (FIG. 6). In the active position the duct inlet 106 is positioned adjacent the burner 25 to intercept and convey a portion of the burner output directly to the fuel storage container, and the heat duct outlet 107 exhausts this heat directly onto the side of the fuel container. In the inactive position the heat duct 105 is rotated on a pivot 109 to move the duct inlet and outlet to positions where they do not actively intercept and convey heat from the burner to the fuel container. The heat duct is mounted in the overheat dump port 60 since the dump port is substantially larger than the duct 105, thus providing ample room for proper movement of the duct 105 but not obstructing the normal operation of the overheat dump port.

The heat duct 105 includes a control knob 111 connected thereto. In the preferred embodiment the control knob is supported at some distance from the axis of rotation about pivot 109 so that knob 111 acts as a weight to help hold the duct in the selected position. More particularly, the center of gravity of the movable portions of duct 105 and pivot 109, including the control knob 111, is adjusted to be over the pivot 109 when the duct is approximately midway between the active and inactive positions. This creates a gravitationally unstable condition, so that when the control knob and duct are pivoted to one side or the other, they are gravitationally biased to remain there. This provides an easy and inexpensive way for the operator to apply additional heat to the container, or not, as he chooses.

As may be seen, therefore, the present invention provides numerous advantages. It includes special provisions to maintain safe operation in the event that the plenum outlet becomes obstructed, so that the flames from the burner do not backfire over the root of the fan blades and over the motor. The invention also provides for maintaining normal operation of the heater in extremely cold environments so that the proper operating pressure is not lost and condensation does not develop in the fuel conduit lines. Additionally, a special preheating facility is provided for initially starting the heater in the event that it is already cold soaked, and means are provided in connection with this to remove condensate from the fuel line before it reaches the pneumatic motor. These features are conveniently combined with the overheat dump port, which provides an ideal location and access for them. Additionally, the high voltage electrode of the spark generator no longer needs high voltage insulation due to the access provided by the overheat dump port. Once in operation, the present invention also provides an improved motor valve to permit the pneumatic motor and fan to be adjusted for operation as desired.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A forced air heater including means for storing fuel under pressure, a plenum chamber having an outlet, a fuel burner for burning the fuel and exhausting the burning fuel and hot combustion products thereof into the plenum chamber to supply heat to the plenum chamber, a fan adapted to force air through the plenum chamber, a pneumatic motor having an inlet and an exhaust and being connected for driving the fan, and fuel conduit means connecting the fuel storing means to the motor inlet and the motor exhaust to the fuel burner, the improvement comprising:
   a. an overheat dump port in the plenum chamber providing an auxiliary exit for the air forced into the plenum by the fan and for the combustion products of the burning fuel to maintain substantially uninterrupted movement and exhaust thereof in the event that the plenum outlet becomes obstructed,
   b. means for exposing the fuel storing means to the heat produced by the fuel burner to help counteract the tendency of the fuel storing means to cool as fuel is withdrawn therefrom,
   c. a heat duct mounted to intercept and convey a portion of the hot output from the fuel burner directly to the fuel storing means,
   d. means mounting the fuel storing means near said overheat dump port, and
   e. means mounting said heat duct in said overheat dump port for movement between active and inactive positions, said active position intercepting and conveying said portion of the fuel burner output to the fuel storing means, and said inactive position not so intercepting and conveying said portion of the burner output.

2. The forced air heater of claim 1 further comprising means pivoting said heat duct for movement between said active and inactive positions, said duct pivoting means being located below the center of gravity of the movable portions of said duct and pivot when said duct is approximately midway between said active and inactive positions to cause said duct to be biased gravitationally to remain in whichever position it is placed.

3. A forced air heater including means for storing fuel under pressure, a plenum chamber having an inlet and an outlet, a fuel burner for burning the fuel and exhausting the burning fuel and hot combustion products thereof into the plenum chamber to supply heat to the plenum chamber, a fan adapted to force air through the plenum chamber, a pneumatic motor having an inlet and an exhaust and being connected for driving the fan, and fuel conduit means connecting the fuel storing means to the motor inlet and the motor exhaust to the fuel burner, the improvement comprising:
- a. an overheat dump port in the plenum chamber providing an auxiliary exit for the air forced into the plenum by the fan and for the combustion products of the burning fuel to maintain substantially uninterrupted movement and exhaust thereof in the event that the plenum outlet becomes obstructed, and
- b. a segment of the fuel conduit portion between the fuel storing means and the pneumatic motor being located within the plenum in the stream of the hot combustion products from the fuel burner for exposing the portion of the fuel conduit means between the fuel storing means and the pneumatic motor to the heat produced by the fuel burner to help counteract condensation of gaseous fuel in said portion of the fuel conduit caused by temperature differences between the fuel storing means and said portion of the fuel conduit, said portion of the fuel conduit passing in and out of the plenum through said overheat dump port.

4. A forced air heater including means for storing fuel under pressure, a plenum chamber having an inlet and an outlet, a fuel burner for burning the fuel and exhausting the burning fuel and hot combustion products thereof into the plenum chamber to supply heat to the plenum chamber, a fan adapted to force air through the plenum chamber, a pneumatic motor having an inlet and an exhaust and being connected for driving the fan, and fuel conduit means connecting the fuel storing means to the motor inlet and the motor exhaust to the fuel burner, the improvement comprising:
- a. an overheat dump port in the plenum chamber providing an auxiliary exit for the air forced into the plenum by the fan and for the combustion products of the burning fuel to maintain substantially uninterrupted movement and exhaust thereof in the event that the plenum outlet becomes obstructed,
- b. the fuel conduit means having a low point upstream from the pneumatic motor, and
- c. a secondary fuel line connected between said low point and the fuel burner to permit fuel and fuel condensate to be drawn from said low point and conducted directly to the fuel burner, bypassing the pneumatic motor.

5. The forced air heater of claim 4 further comprising a valve in said secondary fuel line to control the flow of fuel therethrough to permit operation of the burner independently of the pneumatic motor.

6. A forced air heater including means for storing fuel under pressure, a plenum chamber having an inlet and an outlet, a fuel burner for burning the fuel and exhausting the burning fuel and hot combustion products thereof into the plenum chamber to supply heat to the plenum chamber, a fan adapted to force air through the plenum chamber, a pneumatic motor having an inlet and an exahust and being connected for driving the fan, and fuel conduit means connecting the fuel storing means to the motor inlet and the motor exhaust to the fuel burner, the improvement comprising:
- a. an overheat dump port in the plenum chamber providing an auxiliary exit for the air forced into the plenum by the fan and for the combustion products of the burning fuel to maintain substantially uninterrupted movement and exhaust thereof in the event that the plenum outlet becomes obstructed,
- b. a spark generator for igniting the fuel at the burner, and
- c. a high voltage conduit passing from the generator into the plenum and to the burner through said overheat dump port to eliminate the need for insulating the high voltage conduit from the plenum.

7. A forced air heater including means for storing fuel under pressure, a plenum chamber having an inlet and an outlet, a fuel burner for burning the fuel and exhausting the burning fuel and hot combustion products thereof into the plenum chamber to supply heat to the plenum chamber, a fan adapted to force air through the plenum chamber, a pneumatic motor having an inlet and an exhaust and being connected for driving the fan, and fuel conduit means connecting the fuel storing means to the motor inlet and the motor exhaust to the fuel burner, the improvement comprising:
- a. a heat duct mounted to intercept and convey a portion of the hot output from the fuel burner directly to the fuel storing means, and
- b. means mounting said heat duct for movement between active and inactive positions, said active position intercepting and conveying said portion of the fuel burner output to the fuel storing means, and said inactive position not so intercepting and conveying said portion of the burner output.

8. A forced air heater including means for storing fuel under pressure, a plenum chamber having an inlet and an outlet, a fuel burner for burning the fuel and exhausting the burning fuel and hot combustion products thereof into the plenum chamber to supply heat to the plenum chamber, a fan adapted to force air through the plenum chamber, a pneumatic motor having an inlet and an exhaust and being connected for driving the fan, and fuel conduit means connecting the fuel storing means to the motor inlet and the motor exhaust to the fuel burner and having a low point upstream from the pneumatic motor, the improvement comprising:

a secondary fuel line connected between the low point and the fuel burner to permit fuel and fuel condensate to be drawn from the low point and conducted directly to the fuel burner, bypassing the pneumatic motor.

9. A forced air heater including means for storing fuel under pressure, a plenum chamber having an inlet and an outlet, a fuel burner for burning the fuel and exhausting the burning fuel and hot combustion products thereof into the plenum chamber to supply heat to the plenum chamber, a fan adapted to force air through the plenum chamber, a pneumatic motor having an inlet and an exhaust and being connected for driving the fan, and fuel conduit means connecting the fuel storing means to the motor inlet and the motor exhaust to the fuel burner, the improvement comprising:
- a. an overheat dump port in the plenum chamber providing an auxiliary exit for the air forced into the plenum by the fan and for the combustion products of the burning fuel to maintain substantially uninterrupted movement and exhaust thereof in the event that the plenum outlet becomes obstructed, said overheat dump port being located upstream of the terminal end of the flame from the fuel burner in a portion of the plenum chamber downstream from the fuel burner and having a normal operating pressure below the ambient atmospheric pressure so that air flow is normally induced into the plenum chamber through said overheat dump port, and exhausts outwardly therethrough only upon obstruction of the plenum outlet, b. means for counteracting the upstream pressure increase in the plenum caused by the flame to keep the normal operating pressure at said overheat dump port below the ambient atmospheric pressure, c. means mounting said fuel storing means near said overheat dump port and with a portion of the fuel storing means within the plenum in the stream of the hot combustion products from the fuel burner to expose the fuel storing means to the heat produced by the fuel burner to help counteract the tendency of the fuel storing means to cool as fuel is withdrawn therefrom, d. a heat duct mounted to intercept and convey a portion of the hot output from the fuel burner directly to the fuel storing means.

e. means mounting and pivoting said heat duct in said overheat dump port for movement between active and inactive positions, said active position intercepting and conveying said portion of the fuel burner output to the fuel storing means, and said inactive position not so intercepting and conveying said portion of the burner output, said duct mounting and pivoting means being located below the center of gravity of the movable portions of said duct and pivot when said duct is approximately midway between said active and inactive positions to cause said duct to be biased gravitationally to remain in whichever position it is placed, f. a segment of the portion of the fuel conduit between the fuel storing means and the pneumatic motor being located within the plenum in the stream of the hot combustion products from the fuel burner and passing in and out of the plenum through said overheat dump port for exposing the portion of the fuel conduit between the fuel storing means and the pneumatic motor to the heat produced by the fuel burner to help counteract condensation of gaseous fuel in said portion of the fuel conduit caused by temperature differences between the fuel storing means and said portion of the fuel conduit, g. a low point in the fuel conduit upstream from the pneumatic motor, h. a secondary fuel line connected between said low point and the fuel burner to permit fuel and fuel condensate to be drawn from said low point and conducted directly to the fuel burner, bypassing the pneumatic motor, i. a valve in said secondary fuel line to control the flow of fuel therethrough to permit operation of the burner independently of the pneumatic motor, j. a spark generator for igniting the fuel at the burner, and k. a high voltage conduit passing from the generator into the plenum and to the burner through said overheat dump port to eliminate the need for insulating the high voltage conduit from the plenum.

* * * * *